United States Patent
Yamamoto

(10) Patent No.: US 7,126,723 B1
(45) Date of Patent: Oct. 24, 2006

(54) PRODUCING ENGRAVING-STYLE HALFTONE IMAGES

(75) Inventor: Akio Yamamoto, Yokohama (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 09/632,809

(22) Filed: Aug. 4, 2000

(30) Foreign Application Priority Data

Aug. 6, 1999 (JP) ................. 11-256084

(51) Int. Cl.
  G06K 15/00 (2006.01)
  H04N 1/40 (2006.01)
  B41C 1/02 (2006.01)
  B41C 1/04 (2006.01)

(52) U.S. Cl. .................. 358/3.3; 358/2.1; 358/3.29; 382/257

(58) Field of Classification Search .............. 358/1.9, 358/3.2, 3.22, 3.28, 3.29, 3.31, 3.02, 2.1, 358/3.3; 382/212, 215, 308, 257; 345/582, 345/584–587
See application file for complete search history.

(56) References Cited

U.S. PATENT DOCUMENTS

| 4,821,212 | A | * | 4/1989 | Heartz ........................ 345/426 |
| 4,982,293 | A | | 1/1991 | Ishii |
| 5,097,427 | A | * | 3/1992 | Lathrop et al. ............. 345/587 |
| 5,175,808 | A | * | 12/1992 | Sayre ......................... 345/647 |
| 5,204,944 | A | | 4/1993 | Wolberg et al. |
| 5,224,208 | A | * | 6/1993 | Miller et al. ................ 345/609 |
| 5,329,381 | A | | 7/1994 | Payne |
| 5,579,457 | A | | 11/1996 | Hall |
| 5,583,660 | A | | 12/1996 | Rylander |
| 5,602,972 | A | | 2/1997 | Hada et al. |
| 5,696,604 | A | * | 12/1997 | Curry ......................... 358/3.02 |
| 5,706,099 | A | | 1/1998 | Curry |
| 5,822,469 | A | | 10/1998 | Silverstein |
| 5,929,866 | A | * | 7/1999 | Arnold ....................... 345/471 |
| 5,988,504 | A | * | 11/1999 | Smitt ......................... 382/237 |
| 6,061,477 | A | * | 5/2000 | Lohmeyer et al. ......... 382/300 |
| 6,587,114 | B1 | * | 7/2003 | Peercy et al. .............. 345/582 |

FOREIGN PATENT DOCUMENTS

| JP | 07085273 A | 3/1995 |
| JP | 10100479 A | 4/1998 |
| JP | 10262151 A | 9/1998 |

* cited by examiner

Primary Examiner—David Moore
Assistant Examiner—James Thompson

(57) ABSTRACT

An image processing scheme that applies engraving-style effects to an image is described. In one embodiment, an initial line pattern is warped to produce a warped line pattern, and an original image is mapped onto the warped line pattern to produce an engraving-style halftone image. In accordance with this image processing scheme, halftone line pattern effects are applied to an image in a manner that preserves sufficient contrast information from the original image that a true engraving-style image may be produced. The result is an image that has a digital engraving effect that simulates a classic old world engraving.

3 Claims, 8 Drawing Sheets

FIG. 6C
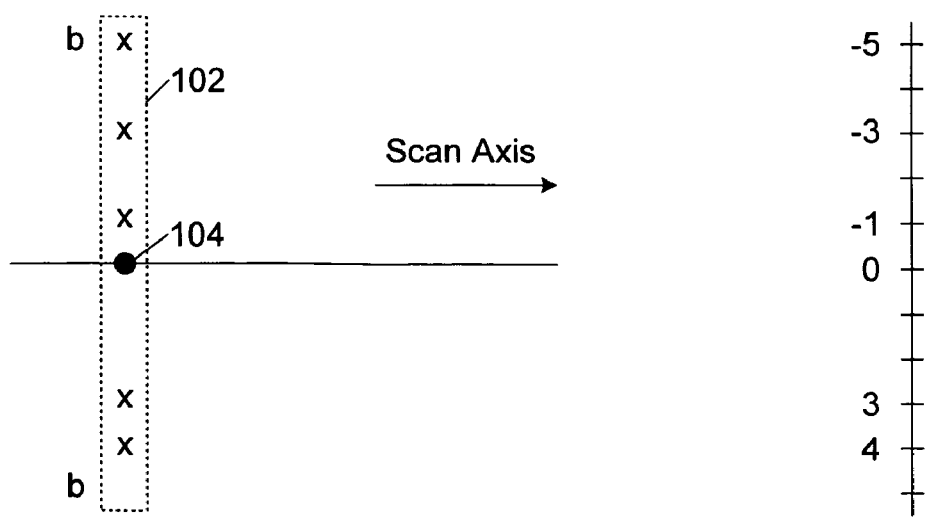
FIG. 7A
FIG. 7B

PRODUCING ENGRAVING-STYLE HALFTONE IMAGES

CROSS-REFERENCE TO RELATED APPLICATIONS

Under 35 U.S.C. § 119, this application claims the benefit of Japanese Patent Application No. 11.256084, filed Aug. 6, 1999, by Akio Yamamoto, and entitled "Method for Producing Engraving-Style Halftone Images," which is incorporated herein by reference.

TECHNICAL FIELD

This invention relates to digital image processing and, more particularly, to systems and methods for producing engraving-style halftone images.

BACKGROUND

Digital images are formed from an array of pixels (picture elements), each pixel having an assigned color and intensity. Digital images may be processed in a variety of different ways to achieve any number of desired effects.

For example, digital images may be processed to conform to the format of a particular output device (e.g., a printer or plotter). Typically, an image must be converted into a halftone image before it may be printed by an output device. Halftoning is the process of breaking down a continuous tone image into solid spots of differing sizes to create the illusion of transitioning grays or colors in a printed image. Halftones may be created by different methods, including error diffusion, dot pattern, random dither and ordered dithered methods. Each halftone processing method involves converting continuous tone image data into a plurality of binary halftone dots with a density gradation that is similar to that of the original continuous tone image.

Digital images also may be processed to alter their appearance. For example, a digital image may be filtered to add one or more different effects, including fine arts and hand drawn effects, impressionistic and mosaic effects, noise effects, lighting effects, and distortion effects. Adobe™ Photoshop™ (available from Adobe Systems, Incorporated of San Jose, Calif.) provides a halftone pattern filter that applies halftone line pattern effects to an image. Other appearance-altering digital image processing techniques are known.

SUMMARY

The invention provides an image processing scheme that applies engraving-style effects to an image. In particular, the invention applies halftone line pattern effects to an image in a manner that preserves sufficient contrast information from the original image that a true engraving-style image may be produced. The resulting image has a digital engraving effect that simulates a classic old world engraving.

In one aspect, the invention features an image processing scheme (system and method) in accordance with which an initial line pattern is warped to produce a warped line pattern, and an original image is mapped onto the warped line pattern to produce an engraving-style halftone image.

Embodiments of the invention may include one or more of the following features.

The initial line pattern preferably is warped based upon pixel values of the original image. The initial line pattern may be oriented substantially along an initial direction and the initial line pattern is warped in a direction substantially orthogonal to the initial direction. In one embodiment, the initial line pattern is warped based upon a density map extracted from pixel values of the original image. A density map may be produced by sampling pixel values of the original image. In another embodiment, the initial line pattern is warped based upon gradient information computed from pixel values of the original image. The gradient information for a pixel location may be computed based upon a weighted averaging of gradient information computed from neighboring pixel values. The initial line pattern preferably is warped based upon a set of displacement values computed for pixel locations along each line of the initial line pattern. The initial line pattern also preferably is warped by inserting or removing one or more lines between adjacent lines of the initial line pattern.

The original image preferably is mapped onto the warped line pattern based upon a comparison of original image pixel values and warped line pattern pixel values. For example, the original image may be mapped onto the warped line pattern by producing black pixel values of the engraving-style image at pixel locations where original image pixel values are less than corresponding warped line pattern pixel values, and producing white pixel values of the engraving-style image at pixel locations where original pixel values are greater than or equal to corresponding warped line pattern pixel values.

In another aspect, the invention features a computer readable medium carrying instructions for implementing the above-described image processing scheme.

Among the advantages of the invention are the following.

The invention enables a true three-dimensional engraving-style image to be produced from a continuous tone image. In addition, because the resulting engraving-style image may be formed from a series of continuous pixel data in the scanning direction, run-length data compression methods may be used to compress the engraving-style image data with a high compression ratio. This feature improves the speed at which the image data may be transmitted, for example, by facsimile.

Other features and advantages of the invention will become apparent from the following description, including the drawings and the claims.

DESCRIPTION OF DRAWINGS

FIG. 6C is a front view of a density map generated from the original image of FIG. 2A.

FIG. 7A is a diagrammatic view of a search window applied over a region of the density map of FIG. 6C.

FIG. 7B is a plot of displacement values corresponding to halftone dots within the search window of FIG. 7A.

DETAILED DESCRIPTION

Figure 1:
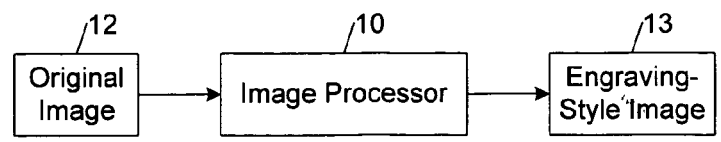
FIG. 1 is a block diagram of an image processor producing an engraving-style image from an original image.
Figure 2A:
FIG. 2A is a front view of the original image of FIG. 1.
Figure 2B:
FIG. 2B is a front view of the engraving-style image of FIG. 1.

Referring to FIGS. 1, 2A and 2B, in one embodiment, an image processor 10 is configured to process an original image 12 (FIG. 2A) to produce an engraving-style image 13 (FIG. 2B). Original image 12 may be a continuous tone image, a multi-tone image or a halftone image. In addition, original image 12 may be a color image or a grayscale image. In the present embodiment, original image 12 is a 8-bit grayscale image formed from an 512×512 array of pixels with a resolution of 300 dpi. The resulting engraving-style image 13 preferably is a halftone image having a three-dimensional digital engraving effect that simulates a classic old world engraving. In particular, engraving-style image 13 substantially preserves three-dimensional information contained in original image 12 to produce realistic engraving-style effects.

Figure 3:
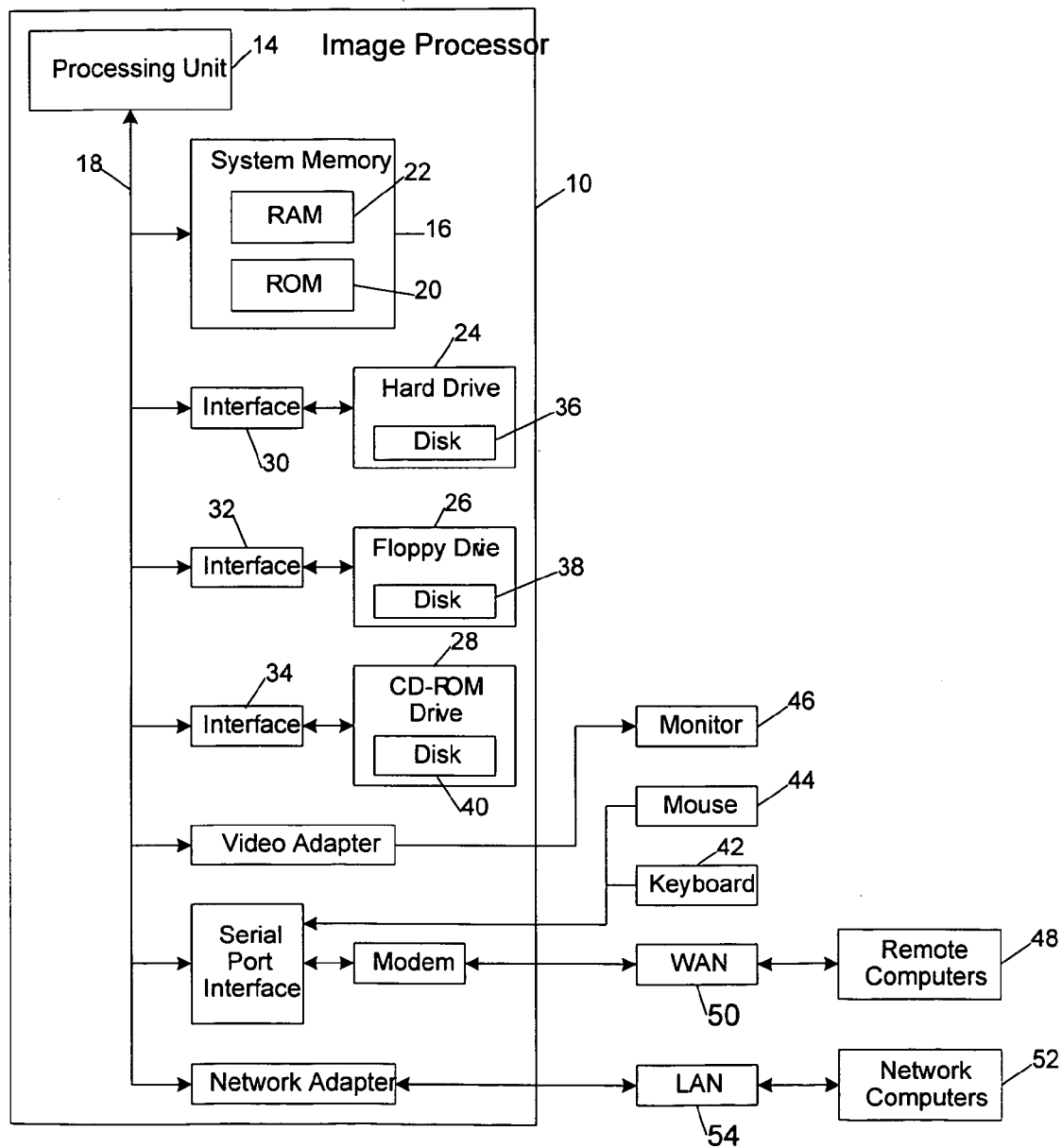
FIG. 3 is a block diagram of the image processor of FIG. 1.

Referring to FIG. 3, in one embodiment, image processor 10 includes a processing unit 14, a system memory 16, and a system bus 18 that couples processing unit 14 to the various components of image processor 10. Processing unit 14 may include one or more processors, each of which may be in the form of any one of various commercially available processors. System memory 16 includes a read only memory (ROM) 20 that stores a basic input/output system (BIOS) containing start-up routines for image processor 10, and a random access memory (RAM) 22. System bus 18 may be a memory bus, a peripheral bus or a local bus, and may be compatible with any of a variety of bus protocols, including PCI, VESA, Microchannel, ISA, and EISA. Image processor 10 also includes a hard drive 24, a floppy drive 26, and CD ROM drive 28 that are connected to system bus 18 by respective interfaces 30, 32, 34. Hard drive 24, floppy drive 26 and CD ROM drive 28 contain respective computer-readable media disks 36, 38, 40 that provide non-volatile storage for data, data structures and computer-executable instructions. Other computer-readable storage devices (e.g., magnetic tape drives, flash memory devices, and digital video disks) also may be used with image processor 10. A user may interact (e.g., enter commands or data) with image processor 10 using a keyboard 42 and a mouse 44. Other input devices (e.g., a microphone, joystick, or touch pad) also may be provided. Information may be displayed to the user on a monitor 46. Image processor 10 also may include peripheral output devices, such as speakers, a printer, and a scanner. Image processor 10 may communicate with remote computers 48 over a wide area network (WAN) (e.g., the Internet) 50, and may communicate with network computers 52 over a local area network (LAN) 54. Remote computers 48 and network computers 52 may be workstations, image processors, routers, peer devices or other common network nodes.

Figure 4:
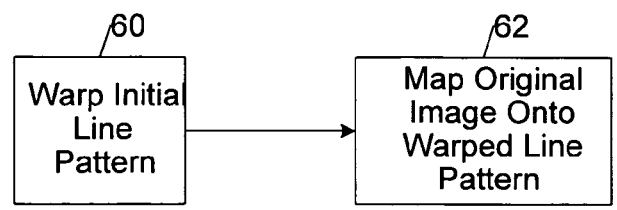
FIG. 4 is a flow diagram of an image processing method.

As shown in FIG. 4, in general, image processor 10 produces engraving-style image 13 by warping an initial line pattern (step 60), and mapping original image 12 onto the warped line pattern (step 62).

Figure 5:
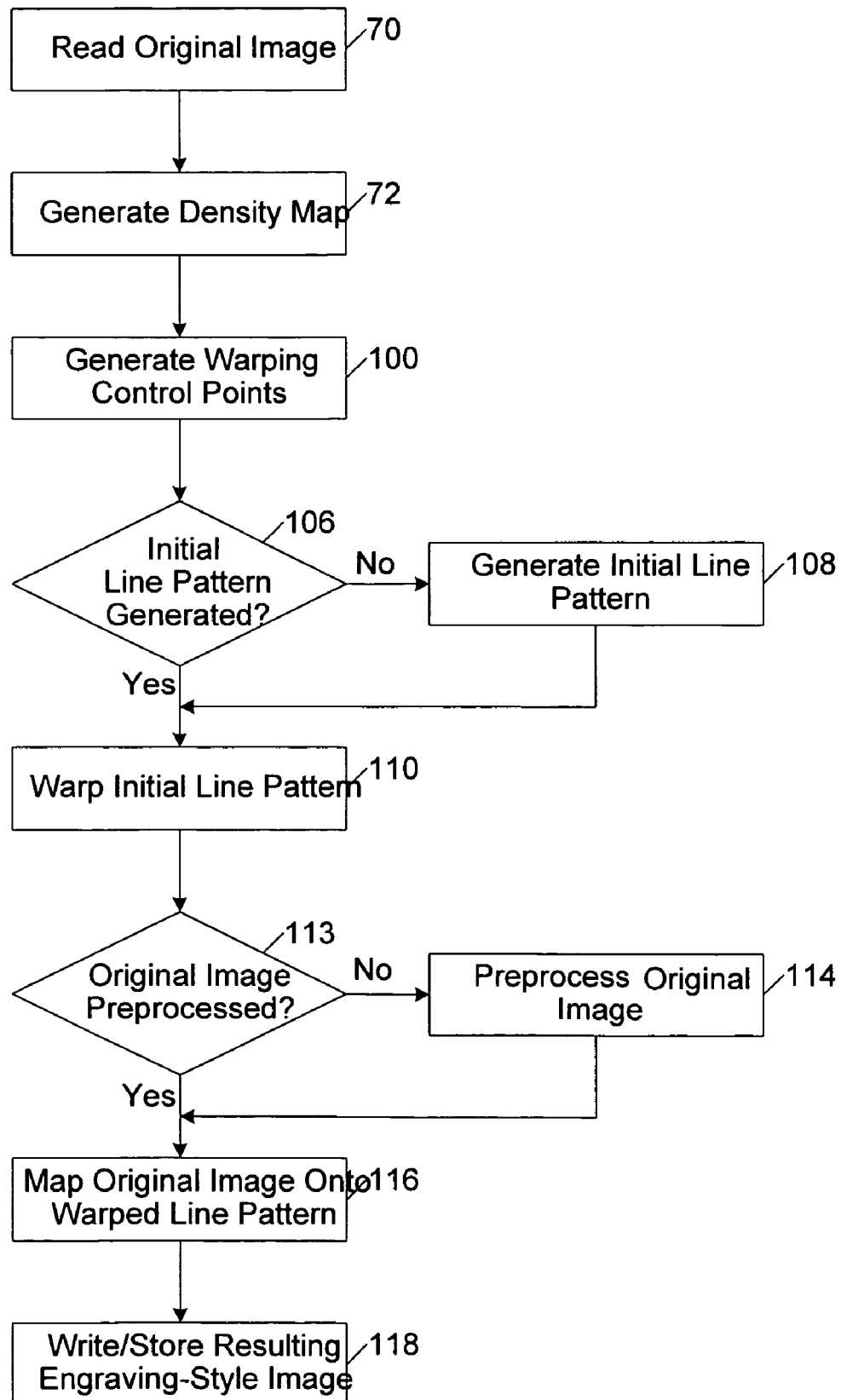
FIG. 5 is a flow diagram of an image processing method.

Referring to FIG. 5, in one particular image processing embodiment, image processor 10 produces engraving-style image 13 from original image 12 as follows. Image processor 10 first reads original image 12 (step 70). Original image 12 may be a photograph, in which case original image 12 may be read by a scanner (e.g., an HP ScanJet® scanner available from Hewlett-Packard Company of Palo Alto, Calif.), and the resulting digital image may be stored in any one of a variety of raster formats (e.g., GIF, PCX or TIFF). Alternatively, original image 12 may be a digital image (e.g., produced by a scanner or a digital camera), in which case original image 12 simply may be retrieved from the image storage location (e.g., media disks 30–34 of hard drive 24, floppy drive 26 or CD ROM drive 40).

Figure 6A:
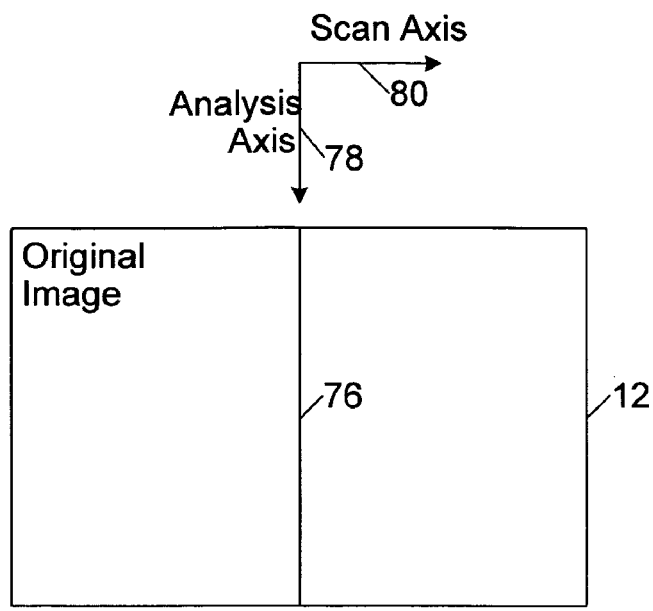
FIG. 6A is a diagrammatic view of an original image over which an analysis line is being scanned.
Figure 6B:
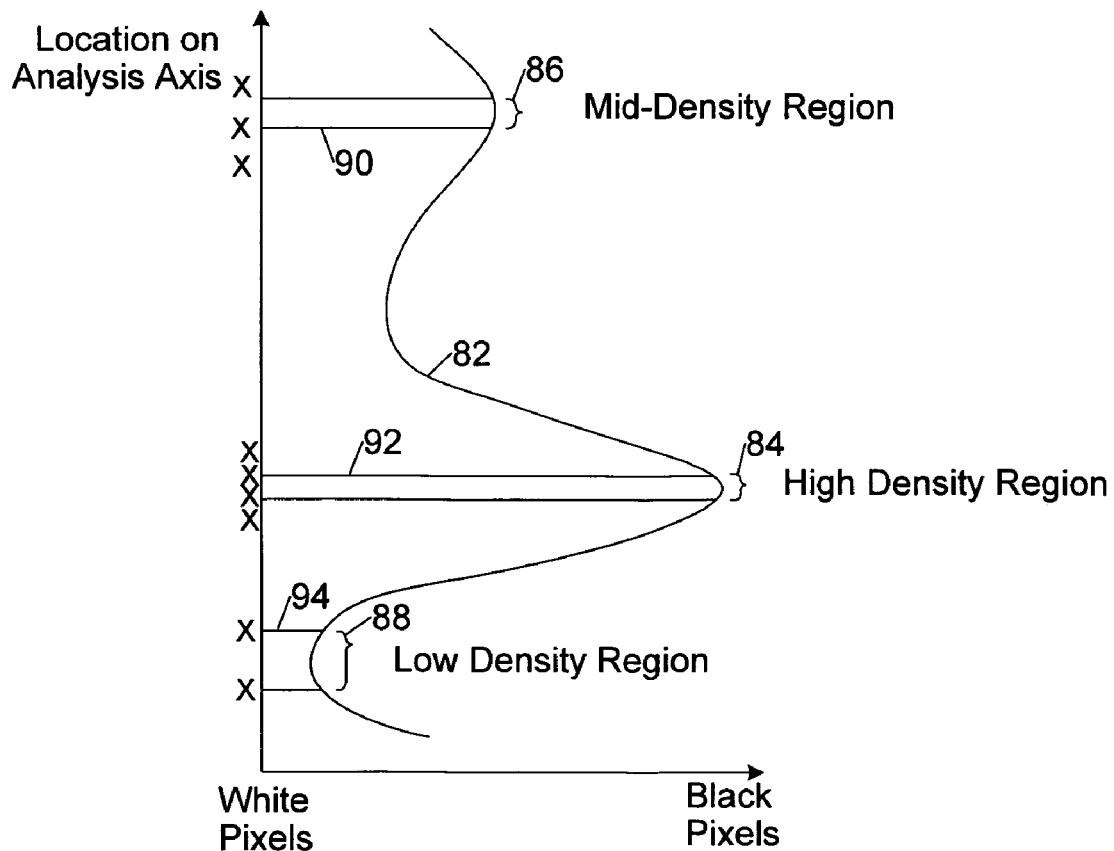
FIG. 6B is a plot of pixel shading values along the analysis line of FIG. 6A.

Referring to FIGS. 6A–6C, after reading the image data, image processor 10 extracts a density map 74 (FIG. 6C) from original image 12 (step 72). To produce density map 74, image processor scans an analysis line 76, which is oriented along an analysis axis 78, across original image 12 in a scanning direction 80. The pixel shading (or darkness) values along analysis line 76 is simulated in density map 74 by a plurality of halftone dots (represented by "x" in FIG. 6B). The halftone dots are arranged according to the original image gray level distribution of shading values along analysis axis 76. That is, the density of halftone dots tracks the shading of original image 12 so that the dot density is relatively high in darker regions of original image 12 and is relatively low in lighter regions of original image 12. The halftone dots are spaced apart in accordance with the magnitude of gray level distribution curve 82 along analysis line 76. The halftone dot spacing is small, i.e., close, in a relatively dark region 84, medium in a medium intensity region 86, and large, i.e., far, in a relatively bright region 88 of original image 12. The relative halftone dot spacing is selected to track the local gray level of original image 12 by spacing the halftone dots so that the area under gray level distribution curve 82 between any two adjacent halftone dots is substantially the same. Thus, the areas under gray level distribution curve 82 in zones 90, 92 and 94—which are defined between adjacent pixels in mid-density region 86, high density region 84 and low density region 88, respectively—are the substantially the same.

Density map 74, FIG. 6C, is produced by sampling pixel values of original image 12. The sampling rates in the analysis direction 78 and in the scanning direction may be the same or different. In the present embodiment, density map 74 is generated by sampling original image 12 at a rate of ⅓ in the analysis direction 78 and at a rate of ⅓ in the scanning direction 80.

Referring back to FIG. 5 and to FIGS. 7A and 7B, warping control points are computed based upon the vertical distribution of halftone dots in density map 74 as follows (step 100). A search window 102 is centered around a pixel 104 of density map 74. In one embodiment, search window 102 encompasses a vertical array of pixels that is 1 pixel wide and 2b+1 pixels long, where b is an integer. In the present embodiment, search window 102 encompasses a 1×11 pixel array (i.e., b=5). The spacings between the halftone dots within search window 102 and pixel 104 are summed to obtain a warping displacement value for the location of pixel 104. Thus, the warping displacement value (d) for the location of pixel 104 may be computed as follows:

$$d=(-5)+(-3)+(-1)+3+4=-2 \quad (1)$$

which corresponds to a vertical displacement of two pixel locations above pixel 104. Search window 102 is scanned across density map 74 to obtain a set of warping displacement values corresponding to a set of lattice pixel locations. In particular, warping displacement values preferably are computed for lattice pixels located at the intersections of a series of space apart horizontal scan lines and a series of spaced apart vertical lines. As used herein, the term "lattice pixel location" refers to the pixel locations at the intersections of the horizontal and vertical scan lines. Search window 102 preferably is scanned across density map 74 along horizontal scan lines in non-overlapping scan zones. For example, in the present embodiment, adjacent scan lines of window 102 are spaced apart by ten (i.e., 2 b) pixels, resulting in a total of fifty-three scan lines (i.e., 512/10=51.2 plus two boundary scan lines). In other embodiments, the number and, consequently, the spacing between horizontal scan lines may be different. The spacing between the vertical scan lines also may vary. In the present embodiment, the vertical scan lines are spaced apart by thirty pixels, resulting in nineteen vertical scan lines (i.e., 512/30=17.1 plus two boundary scan lines). A set of warping control points is generated by displacing the lattice pixel locations in accordance with their corresponding warping displacement values.

Referring back to FIG. 5, if an initial line pattern has not been generated (step 106), the initial line pattern is generated (step 108). The initial line pattern preferably consists of a plurality of lines. The number, width and rate of change in the shading of the lines may be varied as desired. In the present embodiment, the width of each line of the initial line pattern is one and the number of lines coincides with the number of horizontal scan lines of the original image. The lines may consist of a set of parallel lines that are oriented along a preferred direction (e.g., horizontally, vertically or diagonally). Alternatively, the lines may consist of a set of curved lines produced by projecting a set of parallel straight lines over a three dimensional object (e.g., a cylinder or a sphere). The total number of pixels in the initial line pattern preferably is equal to the number of pixels in original image 12 (e.g., 512×512).

Figure 8:
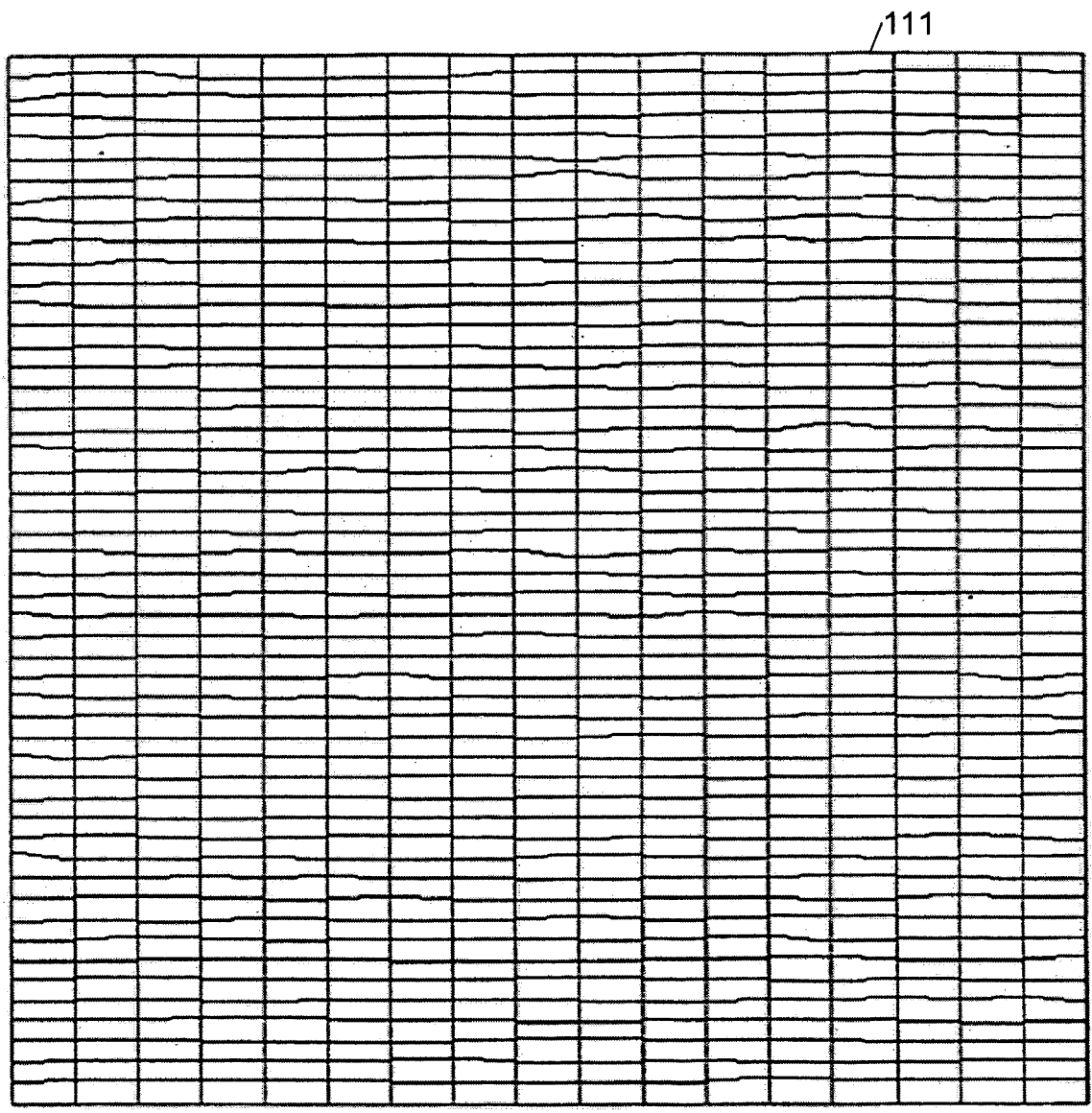
FIG. 8 is a front view of warping control points generated by displacing the lattice pixel locations in accordance with their corresponding warping displacement values.
Figure 9:
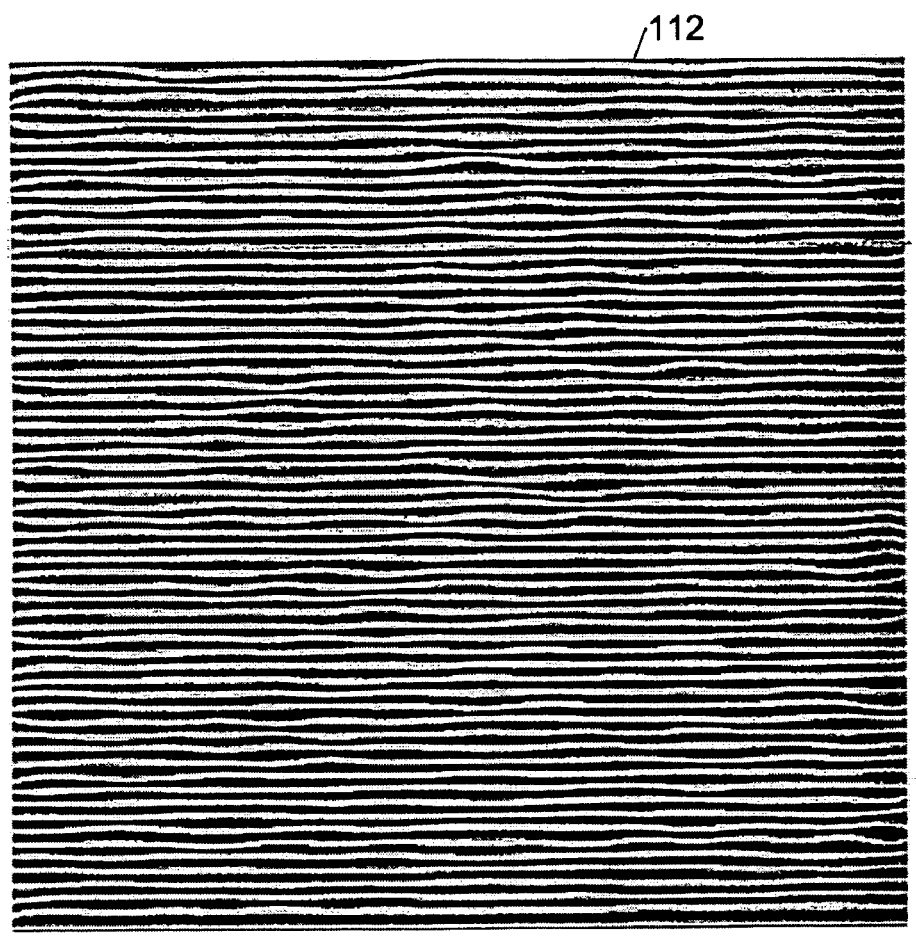
FIG. 9 is a front view of a warped line pattern produced by inserting a plurality of spline interpolation pixels between adjacent lines of the line pattern of FIG. 8.

The initial line pattern is warped based upon the computed warping control points 111 (step 110). In one embodiment, the initial line pattern is mesh warped based upon horizontal and vertical spline interpolation (see, e.g., George Wolberg, "Digital Image Warping," IEEE Computer Society Press (1990)). Referring to FIG. 8, the initial line pattern is warped by horizontal spline interpolation as follows. With respect to the present embodiment, each of the fifty-three horizontal lines of the initial line pattern that are the horizontal scan lines of the lattice pixels is spline interpolated to the corresponding nineteen warping control points to produce a horizontally warped line pattern that consists of a series of smooth, horizontally oriented curved lines. Referring to FIG. 9, the horizontally warped line pattern is further warped by vertical spline interpolation to insert additional pixels or to remove excessive pixels between the lines of horizontally warped line pattern. Spline interpolation techniques may be used to compute the locations of the additional pixels to be inserted or the locations of the excessive pixels to be removed between each pair of vertically spaced apart pixels of the lines of horizontally warped line pattern. As shown in FIG. 9, the vertical spacing between the lines of the resulting warped line pattern 112 substantially tracks the vertical spacing between the lines of the horizontally warped line pattern.

In general, the warping process produces a series of warped lines defined by real number coordinates. Thus, to determine the appropriate brightness values of the real number coordinates, a conversion table mapping the integer coordinates of the initial line pattern to the real number coordinates of the warped line pattern 112 must be generated. This conversion table is produced by weighted averaging according to the distance between real number coordinates and integer coordinates.

If it has not been preprocessed (step 113), the original image is preprocessed (step 114). Preprocessing includes filtering (e.g., low pass filtering to smooth minute changes in brightness) and contrast highlighting to increase the contrast in the image. Other conventional preprocessing techniques also may be applied to the original image.

The original image is mapped onto the horizontally and vertically warped line pattern 112 (step 116). The mapping process is threshold-based, and involves comparing the brightness of original image pixel values to the brightness of corresponding pixels of warped line pattern 112. The result of the mapping process is engraving-style halftone image 13, in which pixels are black at locations where the brightness of original image 12 is less than the brightness of warped line pattern 112, and pixels are white at locations where the brightness of original image 12 is greater than or equal to the brightness of warped line pattern 112.

The resulting engraving-style halftone image 13 may be written to a storage medium or sent to an output device (e.g., a printer or plotter) for printing (step 118).

Other embodiments are within the scope of the claims.

Figure 10:
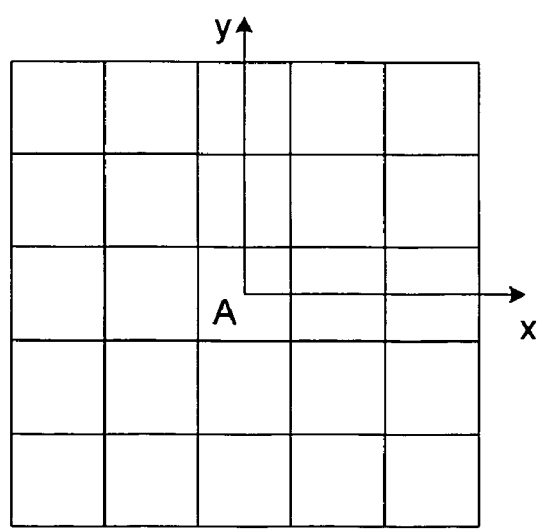
FIG. 10 is a block diagram of a lattice pixel and a plurality of surrounding neighboring pixels in a region of the original image of FIG. 1.

For example, density map generation step 72 in the above-described image processing embodiment may be eliminated, and the warping control points may be computed directly based upon gradient information extracted from the pixel values of original image 12 as follows. Referring to FIG. 10, gradient information is extracted for a lattice pixel location (A) based upon the relative pixel values of neighboring pixels. In particular, the shading gradient for a lattice pixel location A may be expressed as follows:

$$\nabla A(x,y) = (\delta A/\delta x, \delta A/\delta y) \quad (2)$$

The magnitude (G_mag(x, y)) and orientation (G_dir(x, y)) of the shading gradient may be computed from the following equations:

$$G\_mag(x,y) = [(\delta A/\delta x)^2 + (\delta A/\delta y)^2]^{1/2} \quad (3)$$

$$G\_dir(x,y) = \tan^{-1}[(\delta A/\delta x)/(\delta A/\delta y)] \quad (4)$$

The number of neighboring pixels from which the gradient information is computed may vary. In one embodiment, the lattice pixel and the neighboring pixels form a 9×29 pixel array. As shown in FIG. 10, in another embodiment, a 5×5 pixel array may be used to compute the gradient information. Warping displacement values may be computed from equations (3) and (4). In particular, the warping displacement magnitude (V_mag(x, y)) and the warping displacement direction (V_dir(x, y)) may be computed from the following equations:

$$V\_mag(x,y) = \Sigma_{j=-2}^{2} \Sigma_{j=-2}^{2} w\_mag(i,j) \cdot G\_mag(x-i, y-j) \quad (5)$$

$$V\_dir(x,y) = \Sigma_{j=-2}^{2} \Sigma_{j=-2}^{2} w\_dir(i,j) \cdot G\_dir(x-i, y-j) \quad (6)$$

where w_mag(i, j) and w_dir(i, j) are weighting coefficients for pixel values displaced from the lattice pixel location (A) by i pixels in the x-direction and j pixels in the y-direction. The values of all of the weighting coefficients preferably add up to one. In addition, the values of the weighting coefficients preferably are larger for nearby pixel neighbors than for more distant pixel neighbors. For example, in the present embodiment, the weighting coefficient for the lattice pixel A is ½, the weighting coefficient for each of the eight nearest neighbors (i.e., (i, j)={(−1, −1), (−1, 0), (−1, 1), (0, −1), (0, 1), (1, −1), (1, 0), (1, 1)}) is 1/32, and the weighting coefficient for each of the remaining sixteen neighbors is 1/64. In this example, w_mag(i, j)=w_dir(i, j). In other embodiments, however, the magnitude and direction weighting coefficients may be different. The warping control points may be determined from the direction and amount of displacement from each lattice point using V_mag(x, y) and V_dir(x, y).

The systems and methods described herein are not limited to any particular hardware or software configuration, but rather they may be implemented in any computing or processing environment. Image processor 10 preferably is implemented in a high level procedural or object oriented programming language; however, the program may be implemented in assembly or machine language, if desired. In any case, the programming language may be a compiled or interpreted language.

Still other embodiments are within the scope of the claims.

What is claimed is:

1. A method of processing an original image that is either a color or gray scale image and that can be anyone of (a) a continuous tone image, (b) a multi-tone image or (c) a halftone image, the method comprising:
    responding to brightness values of pixels of the original image to produce a horizontally and vertically warped line pattern including a series of warped lines representing warped brightness values of the pixels of the original image; and
    comparing the brightness values of pixels of the original image to the brightness values of spatially corresponding pixels of the horizontally and vertically warped line pattern to produce an engraving-style halftone image such that
        (a) pixels of the engraving-style halftone image that spatially correspond with pixels of the original image are black in response to the spatially corresponding pixels of the original image having a brightness value less than the brightness value of the spatially corresponding pixels of the horizontally and vertically warped line pattern; and
        (b) pixels of the engraving-style halftone image that spatially correspond with pixels of the original image are white in response to the spatially corresponding pixels of the original image having a brightness value greater than or equal to the brightness value of the spatially corresponding pixels of the horizontally and vertically warped line pattern;
    wherein production of the horizontally and vertically warped line pattern includes:
        (a) obtaining brightness values of pixels along a series of lines extending in a first of the horizontal or vertical directions of the original image;
        (b) deriving a gray level distribution curve in response to the brightness values of the pixels along each of the lines;
        (c) determining the spacing between adjacent halftone dots of each gray level distribution curve such that the areas of the gray level distribution curve between the adjacent dots are substantially the same, each line being formed by a search window including the pixels in the line and a predetermined number of pixels removed from the line in the second direction; and
        (d) for pixels on the line, summing the spacing of the halftone dots in the search window to obtain warping displacement values for pixels along the line so as to form a series of warped brightness pattern lines extending in the first direction.

2. The method of claim 1, further including forming the horizontally and vertically warped line pattern by interpolating in the second direction between the brightness values of the series of warped brightness pattern lines.

3. A computer readable medium storing a program which, when executed, causes a computer to perform the steps of claim 1.

* * * * *